United States Patent
Masugi et al.

(10) Patent No.: US 9,570,203 B2
(45) Date of Patent: Feb. 14, 2017

(54) NUCLEAR REACTOR POWER MONITOR

(75) Inventors: Tsuyoshi Masugi, Shinagawa-ku (JP);
Kiyoteru Suzuki, Yokohama (JP);
Surman Yoshinaga, Yokohama (JP);
Atsuhiko Koizumi, Akiruno (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 991 days.

(21) Appl. No.: 13/700,311

(22) PCT Filed: May 26, 2011

(86) PCT No.: PCT/JP2011/062127
§ 371 (c)(1),
(2), (4) Date: Apr. 10, 2013

(87) PCT Pub. No.: WO2011/149026
PCT Pub. Date: Dec. 1, 2011

(65) Prior Publication Data
US 2013/0208844 A1    Aug. 15, 2013

(30) Foreign Application Priority Data

May 28, 2010   (JP) .................. 2010-123502

(51) Int. Cl.
*G21C 7/36*   (2006.01)
*G21D 3/00*   (2006.01)
(Continued)

(52) U.S. Cl.
CPC ............ *G21C 7/36* (2013.01); *G05B 23/0235* (2013.01); *G21D 3/001* (2013.01); *G21C 17/10* (2013.01); *Y02E 30/40* (2013.01)

(58) Field of Classification Search
CPC ..................................... G21C 17/00
(Continued)

(56) References Cited

U.S. PATENT DOCUMENTS

| 4,318,778 A | 3/1982 | Musick |
| 2002/0067790 A1* | 6/2002 | Fukasawa ............. G21C 17/00 376/215 |
| 2002/0154724 A1 | 10/2002 | Fukasawa |

FOREIGN PATENT DOCUMENTS

| JP | 51 67898 | 6/1976 |
| JP | 5-134080 A | 5/1993 |

(Continued)

OTHER PUBLICATIONS

International Preliminary Report on Patentability Issued Jul. 26, 2011 in PCT/JP11/062127 Filed May 26, 2011.
(Continued)

*Primary Examiner* — Jack W Keith
*Assistant Examiner* — Lily C Garner
(74) *Attorney, Agent, or Firm* — Oblon, McClelland, Maier & Neustadt, L.L.P.

(57) ABSTRACT

A nuclear power plant controlling system is provided in which the thermal limit can be brought close to the full limit of operation restrictions by automatic control. The system includes a thermal limit monitor, including a receiver configured to receive a first signal, a prospective time deriving unit configured to derive a prospective time for the first signal to arrive at the full limit, a judging unit configured to judge a remaining time to the prospective time, a compensating unit configured to compensate the first signal based on a second signal, a first transmitter configured to transmit a first instruction to vary a rate factor of the first and second signals by synchronizing the compensation, and a second transmitter configured to transmit a second instruction to hold the first or second signal after arriving at the full limit or at a threshold that is just before the full limit.

2 Claims, 5 Drawing Sheets

(51) Int. Cl.
*G05B 23/02* (2006.01)
*G21C 17/10* (2006.01)

(58) Field of Classification Search
USPC .......................................................... 376/217
See application file for complete search history.

(56) References Cited

FOREIGN PATENT DOCUMENTS

| | | |
|---|---|---|
| JP | 6 148376 | 5/1994 |
| JP | 8-179078 A | 7/1996 |
| JP | 2931658 B2 | 8/1999 |
| JP | 2000 19287 | 1/2000 |
| JP | 2002 48891 | 2/2002 |

OTHER PUBLICATIONS

International Search Report Issued Jul. 26, 2011 in PCT/JP11/062127 Filed May 26, 2011.
Office Action issued Oct. 30, 2015 in Finnish Patent Application No. 20126331 (with English translation).

* cited by examiner

NUCLEAR REACTOR POWER MONITOR

TECHNICAL FIELD

The present invention relates to the controlling nuclear power plant technology by observing a thermal limit.

BACKGROUND ART

In the boil water type nuclear power plant, the thermal limit such as the minimum critical power ratio and maximum linear heat generation ratio which is an indicator of the soundness of fuel is operated and managed so as not to exceed the full limit. These thermal limits calculated by the power distribution based on reactor physics are made to be observable object substitute for the surface temperature of the fuel since it is difficult to measure directly.

These thermal limits are calculated by numerical analysis from distribution of a nuclear reaction cross section, and are calculated with the cycle of several minutes-1 hour by the reactor core performance calculation system with advanced operation throughput.

In advanced boiling water reactor power plant, in order to attain and adjust the target reactor power, it is automatically controlled that the drawing out/insertion operation of a control rod and the increase/decrease operation of a core flow.

Thus, it is necessary for the automatic control of the reactor power to observe the thermal limit continuously, but it is difficult because the calculation of the power distribution is required several minutes as mentioned above.

For this reason, the simple information made by an easy operation with the signal which real-time received from the sensor arranged inside the nuclear reactor is observed continuously instead of the direct observation of the thermal limit.

When the simple information arrives at a full limit which is the operation restrictions set up beforehand, the suspend instruction for automation is outputted and then the automatic control for the control rod and the core flow is suspended (for example, Patent Literature 1).

CITATION LIST

Patent Literatures

Patent Literature 1: JP1976-67898A

SUMMARY OF THE INVENTION

Technical Problem

According to the simple information mentioned above, observation becomes too conservative because the simple information itself originally is lower reliability. Then it brings some subjects that the suspend instruction is outputted with a remarkable margin against the set-up full limit.

In many states of the reactor core, an actual thermal limit is much less than the full limit in spite of the simple information arrives at the set-up full limit. For this reason, even when the automatic control of the control rod and the core flow was suspended once, the exact thermal limit calculated by the power distribution might be far from the full limit. Then it brings some subjects that the automatic control operation are forced to resume repeatedly.

Thus, in order to resume the automatic control once suspended, it is necessary to reconstruct the status such as an automatic power controller, the control rod operating unit, and a recirculation flow operating unit and the like. Then that make it complicated for the process of power control of the nuclear reactor.

That brings some subjects such as increasing workload of the operator for checking operation and so on with resuming the automatic controls, and expanding the adjustment period for the power control of the nuclear reactor.

Thus, in the conventional technology, it was difficult to approach the thermal limit close to the full limit of operation restrictions by automatic control.

The present invention has been made in consideration of such circumstances. An object of the present invention is to provide the technique for controlling nuclear power plant in which the thermal limit can be approached close to the full limit of operation restrictions by the automatic control, using the simple information which is outputted shorter cycle than that of the thermal limit.

Solution to Problem

A nuclear power plant controlling system includes: a first signal receiver configured to receive a first signal; a prospective time deriving unit configured to derive a prospective time for the first signal to arrive at a full limit; a judging unit configured to judge a remaining time to the prospective time breaks a preset value and then request a second signal; a compensating unit configured to compensate the first signal based on the second signal received by the request; a first instruction transmitter configured to transmit a first instruction to vary a rate factor of the first signal and the second signal with synchronizing the compensation; and a second instruction transmitter configured to transmit a second instruction to hold the first signal or the second signal after arriving at the full limit or a threshold which right before the full limit.

Advantageous Effects of Invention

The present invention provides the technique for controlling nuclear power plant in which the thermal limit can be approached close to the full limit of operation restrictions by the automatic control, using the simple information outputted shorter cycle than that of the thermal limit.

BRIEF DESCRIPTION OF FIGS

DESCRIPTION OF EMBODIMENTS

First Embodiment

Figure 1:
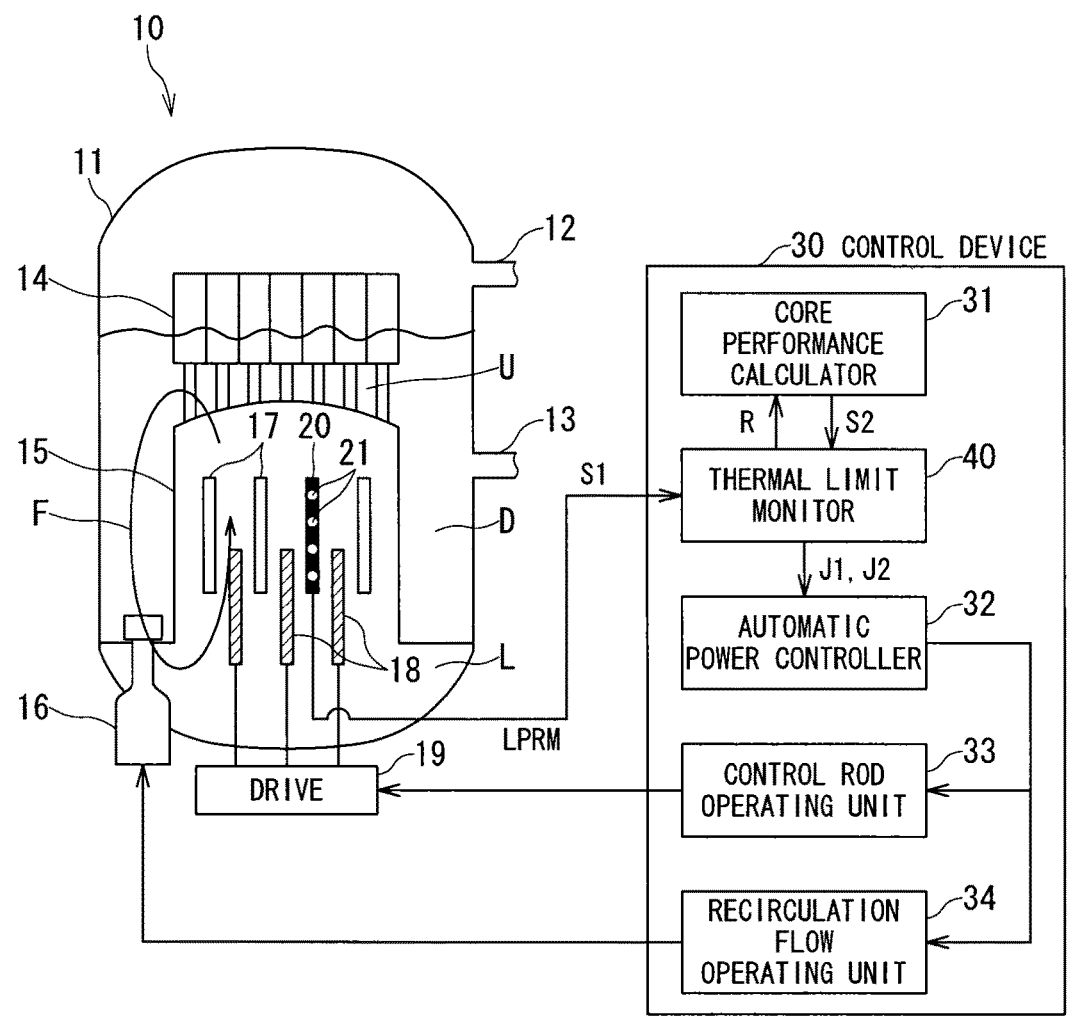
FIG. 1 is a schematic diagram showing an embodiment of the nuclear power plant controlling system according to the present invention.

As shown in FIG. 1, nuclear reactor 10 includes, a reactor core 15 for heating a furnace water held at pressure vessel 11, a steam-water separator 14 for separating the heated furnace water into a steam and a fluid, a main steam line 12 for leading the separated steam to a turbine (not shown), a feed water line 13 for returning a feed water back to the pressure vessel 11 the feed water derives from the steam which worked and expanded in the turbine and then cooled and condensed, a recirculation pump 16 for circulating the furnace water with predetermined core flow F through a downcomer D, a lower plenum L, and a top plenum U the furnace water composed the separated fluid and the feed water joined.

Figure 2:
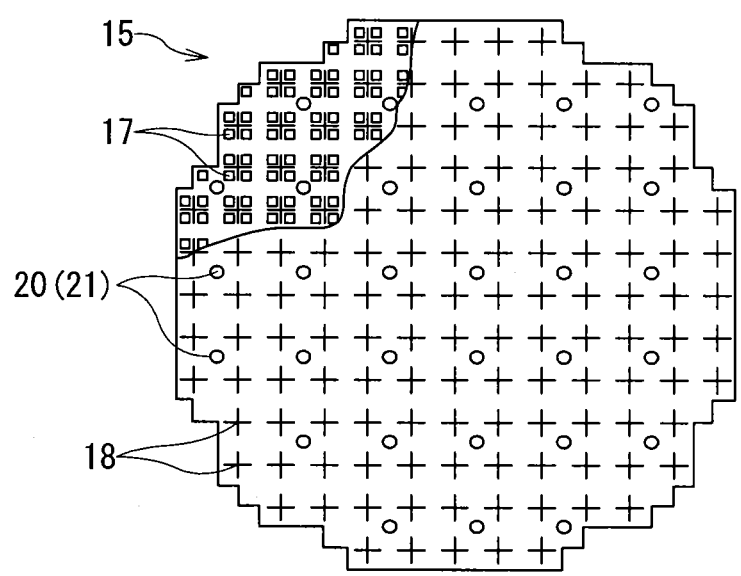
FIG. 2 is a horizontal sectional view of the nuclear reactor applied to the embodiment of the present invention.

As shown in FIG. 2, horizontal sectional view of the reactor core 15 is composed of multi-arranging parts such as, a fuel assembly 17 consist of plurality of fuel rods (not shown) stored in a rectangular pipe-like channel box, a control rod 18 for adjusting number of neutrons by neutron absorption and for controlling a reactor power with drawing out/insertion operation by drive 19 (FIG. 1), and an instrumentation pipe 20 in which one set of four pieces of LPRM detector 21 (FIG. 1) arranged in the vertical direction to detect the neutron.

As shown in FIG. 1, the control device 30 includes, a core performance calculator 31, an automatic power controller 32, a control rod operating unit 33, a recirculation flow operating unit 34, and a thermal limit monitor 40.

The core performance operation part 31 calculates a thermal limit (a critical power ratio or a linear heat generation ratio) with high precision according to the power distribution based on the detection signal from various sensors set in the nuclear reactor 10, and then transmits them to the thermal limit monitor 40 as the second signal S2.

The linear heat generation ratio means a power of per unit length of the fuel rod (not shown) in the fuel assembly 17. The critical power ratio means a ratio of the power of the fuel assembly 17 in which boiling transition happens (marginal output), and an actual power of the fuel assembly.

In the core performance calculator 31, the calculation cycle of these thermal limits (the second signal S2) is a long cycle (for example, about 30 seconds) compared with the sampling interval of the first signal S1.

The thermal limit (the second signal S2) is outputted fixed cycle (for example, 5-minute interval) if the value thereof is far from the full limit G (refer to FIG. 4), while the thermal limit is outputted at a time when the request signal R is received from the thermal limit monitor 40 if the value thereof approached to the full limit G, as mentioned later.

The thermal limit (the second signal S2) is high reliability and high precision value, but it is difficult for them to apply for automatic control of the reactor power because the data sampling interval thereof is long.

On the other hand, the LPRM signal (the first signal S1) is excellent in a response because the data sampling interval thereof is short, but the LPRM signal is not reflect the thermal limit of the reactor core exactly. For this reason, it is inevitable that the automatic control of the reactor power becomes too much conservative if only based on the simple information drawn from the LPRM signal.

The automatic output controller 32 receives the power control instruction (the first instruction J1) from thermal limit monitor 40 to very the up/down rate of the reactor power, and receives the suspend instruction (the second instructions J2) to make the reactor power hold.

Here, the reactor power is controlled by the flow control of the core flow F in the nuclear reactor 10 and by the position adjustment of the control rod 18.

The control rod operating unit 33 operates the drive 19 to move the control rod 18 for a predetermined position with the predetermined rate.

The recirculation flow operating unit 34 adjusts the performance of the recirculation pump 16 to operate the core flow F shows a predetermined value.

Figure 3:
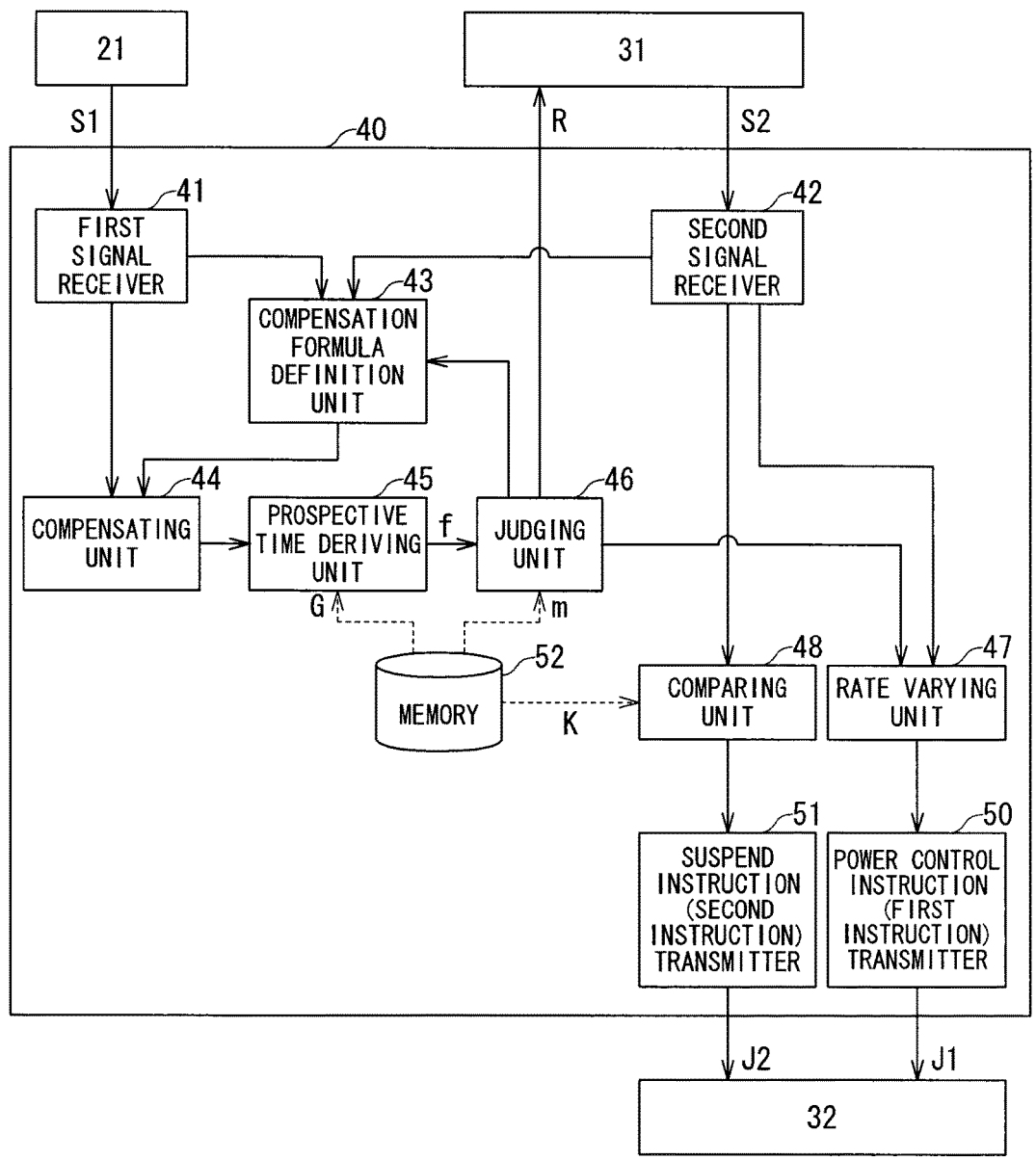
FIG. 3 is a block diagram of the nuclear power plant controlling system concerning to an embodiment.

As shown in FIG. 3, the thermal limit monitor 40 includes: a first signal receiver 41 for receiving a first signal S1, a prospective time deriving unit 45 for deriving a prospective time f for the first signal S1 to arrive at a full limit G (FIG. 4), a judging unit 46 for judging a remaining time to the prospective time f breaks a preset value m and then request a second signal S2 (outputs a request signal R), a compensating unit 44 for compensating the first signal S1 based on the second signal S2 received by the request, a first instruction transmitter 50 for transmitting a first instruction J1 to vary a rate factor of the first signal S1 and the second signal S2 with synchronizing the compensation; and a second instruction transmitter 51 for transmitting a second instruction J2 to hold the first signal S1 or the second signal S2 after arriving at the full limit G or a threshold K which right before the full limit G. Note that the full limits G, the threshold K, and the preset value m are accumulated in the memory 52.

The first signal S1 received at the first signal receiver 41 is a detection signal outputted from the LPRM detector 21 (FIG. 1) which detects a neutron. Note that the first signal S1 is not limited to what is outputted from LPRM detector 21, but can use the suitable detection signal outputted from the sensor set in the nuclear reactor 10.

The first signal S1, which is originally an analog signal, is changed into a digital signal at any timing, and then changed into the simple information imitated to the second signal S2 by easy processing using a predetermined parameter. For this reason, the first signal S1 is acquirable within short cycle several millisecond or less.

Thus the first signal S1 is considered nearly equal to the simple information obtained by easy processes mentioned above that the first signal S1 having an error against the second signal S2 deemed to be a true value. Therefore, in order to secure the conservative control of a nuclear reactor plant, the first signal S1 is processed so that the error may always distribute to the plus side.

The second signal S2 received at the second signal receiver 42 is an calculation signal such as maximum linear heat generation ratio or the minimum critical power ratio transmitted from the core performance calculator 31 which calculates the power distribution in the reactor core 15 (FIG. 1). Note that the second signal S2 is not limited to such a calculation signal, but can use the suitable data whose acquisition cycle is longer than the sampling interval of the first signal S1.

The compensation formula definition unit 43 defines the compensation formula for compensating the first signal S1 based on the newest second signal S2 received by the newest request signal R from the judging unit 46. Note that the same compensation formula is applied for the first signal S1 until the next second signal S2 is received by the next request signal R to redefine the last compensation formula.

Thus, the first signal S1 and the second signal S2 come close to the full limit G, the request signal R comes to be transmitted from the judging unit 46 and then the compensation formula comes to be redefined. While the first signal S1 and the second signal S2 are far from the full limit G, the second signal S2 is transmitted at constant cycle from the core performance calculator 31, in this case it is not necessary to redefine the compensation formula.

The compensating unit 44 compensates the first signal S1 at the time of acquiring that from the first signal receiver 41, by applying the newest compensation formula defined in the unit 43.

Figure 4:
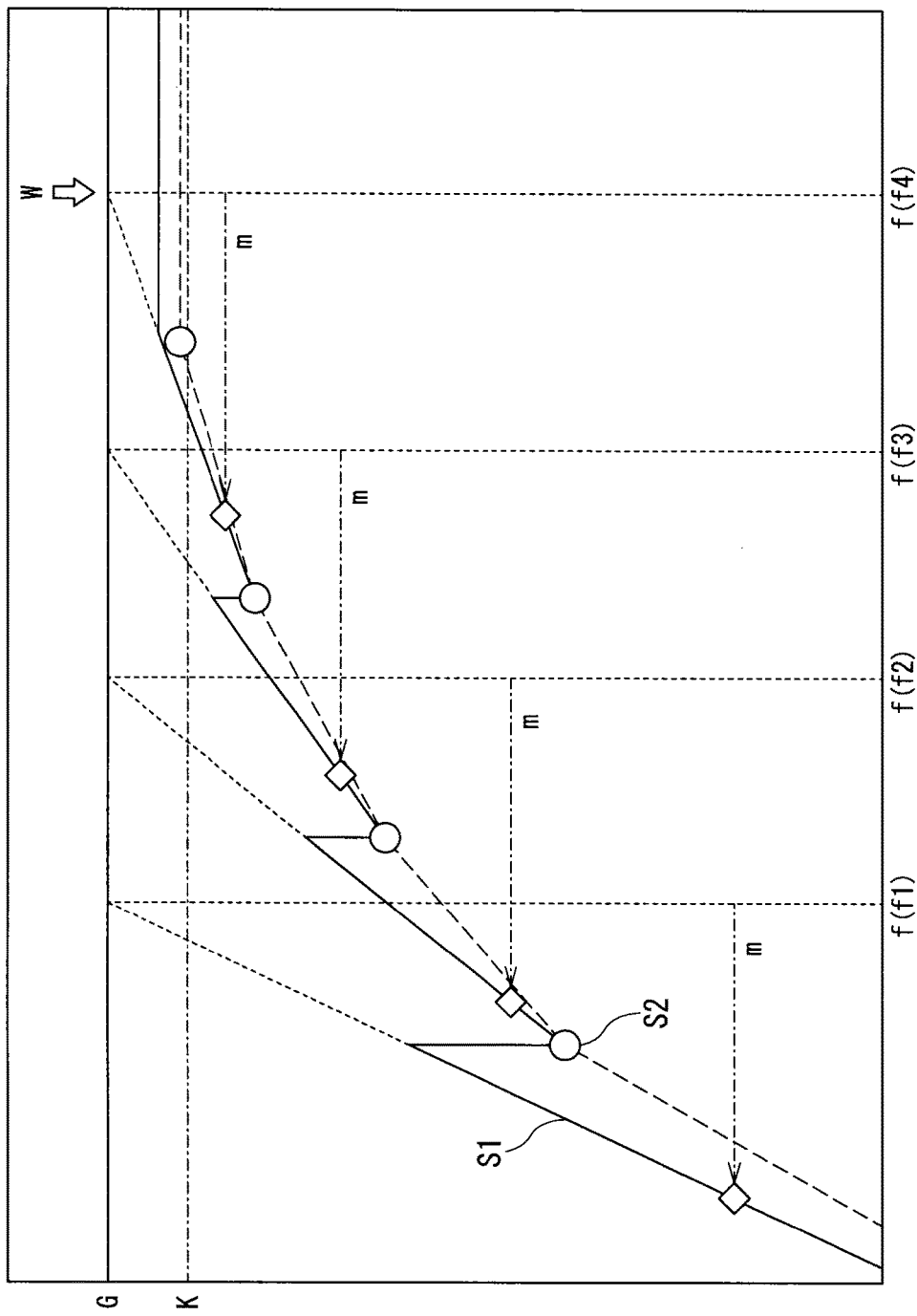
FIG. 4 is an explanatory view of the automatic control by the nuclear power plant controlling system concerning to an embodiment.

As shown in FIG. 4, the prospective time deriving unit 45 derives the prospective time f (f1, f2, f3, f4) after extrapolating the compensated first signal S1 to arrive at the full limit G.

As shown by the diamond mark in FIG. 4, the judging unit 46 transmits the request signal R which request for the second signal S2 to the core performance calculator 31 by judging whether the remaining time breaks the preset value m. The remaining time is the value which subtracted the receiving time of the first signal S1 from the derived prospective time f.

In the core performance calculator 31 starts to calculate the thermal limit (the second signal S2) after receiving the request signal R. As shown by the circle mark in FIG. 4, the calculated second signal S2 is received by the second signal receiver 42. During the period from the diamond mark to the circle mark, it is equivalent to the time adding the calculation time of the thermal limit (second signal S2) in the core performance calculator 31, and the transmission time of the request signal R and the second signal S2.

For this reason, the preset value m needs to be set for a long time than the calculation time of the thermal limit (second signal S2).

As shown in FIG. 4, the rate varying unit 47 adjusts the rate factor of the first signal S1 and the second signal S2 to become small at the receiving time of the second signal S2 (the circle mark) based on the latest request signal R (diamond mark).

The first instruction J1 transmitted from the transmitter 50 are the power control instruction which work on the control rod operating unit 33 and the recirculation flow operating unit 34 so that the power rate of the nuclear reactor 10 may become small.

As shown in FIG. 4, the rate varying unit 47 changes the rate factor so that the thermal limit (the second signal S2) to become hold at an attaining time W which is set up beforehand for the thermal limit close to the full limit G. That is, the rate varying unit 47 changes the rate factor based on the prospective time f derived from the unit 45, and then the compensated first signal S1 or the second signal S2 may be attained to the full limit G or the threshold K within the attaining time W.

The comparing unit 48 makes the suspend instruction transmitter 51 to transmit the suspend instruction (the second instructions J2) comparing the received second signal S2 with the threshold K to find the former has arrived at the later.

The second instructions J2 transmitted from the transmitter 51 encourage the control rod operating unit 33 and the recirculation flow operating unit 34 to suspend the power control of the nuclear reactor 10 to become the first signal S1 or the second signal S2 held in a steady value.

Figure 5:
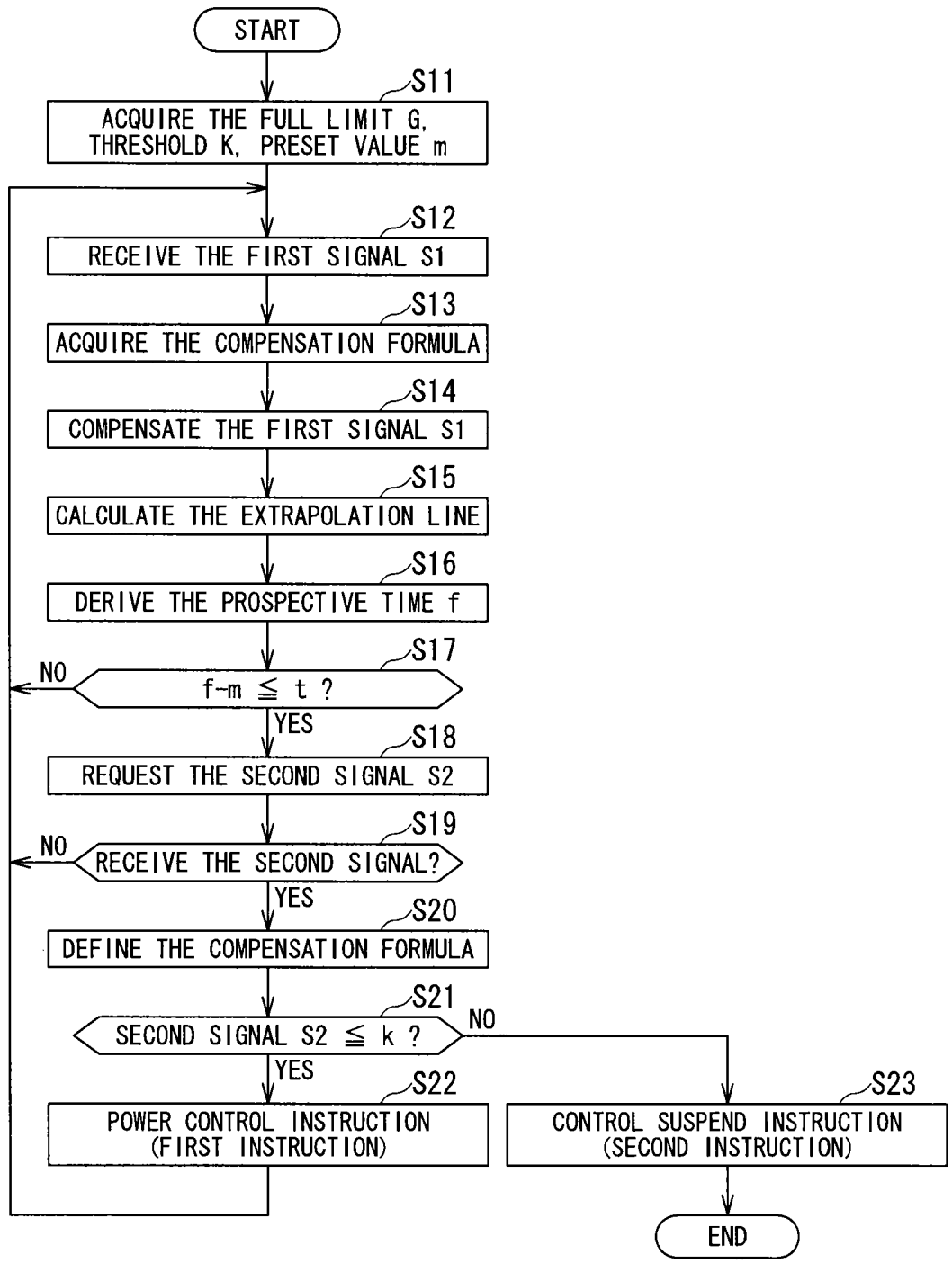
FIG. 5 is a flow chart explaining operation of the nuclear power plant controlling system concerning to an embodiment.

Based on the flow chart of FIG. 5 (suitably refer to FIG. 3 and FIG. 4), operation of the nuclear plant controlling system is explained.

At the start, the full limit G, the threshold K, and the preset value m are made to acquire in the memory 52 of the computer processor (S11). Then the first signal S1 from LPRM detector 21 is received at the first signal receiver 41 (S12).

Next, the compensating unit 44 acquires the compensation formula defined by the definition unit 43 (S13), and then compensates the received first signal S1 (S14). In the prospective time deriving unit 45, the extrapolation line is calculated based on the compensated first signal 51 (S15), and then deriving the prospective time f of the compensated first signal S1 will be arrived at the full limit G (S16).

Next, if the receiving time t of the first signal S1 has reached at the value which deducted preset value m from prospective time f (S17: Yes), the judging unit 46 judges the remaining time of the first signal S1 arrives at the full limit G break the preset value m, and outputs the request signal R which requests the second signal S2 from the core performance calculator 31 (S18).

The flow S12-S16 is repeated, during the period the preset value m is judged not to break by the first signal S1 to arrive at the full limit G (S17: No), and the period until the second signal S2 is received from transmission of the request signal R. (S19: No).

When the second signal S2 is received in the second signal receiver 42 (S19: Yes), the compensation formula definition unit 43 redefines the compensation formula for the first signal S1 using the second signal S2 based on the received request signal R (S20).

Next, it is judged whether the second received signal S2 has arrived at the threshold K, when not having arrived (S21: Yes), the power control instruction (the first instruction J1) which change the rate factor of the thermal limit (the first signal S1 and the second signal S2) synchronizing with redefinition of the compensation formula are transmitted to the automatic power controller 32 (S22). After transmitting the first instruction J1, a flow of operation returns to S12.

While the received second signal S2 has arrived at the threshold K (S21: No), the suspend instruction (the second instructions J2) which made to suspend the power control to hold the thermal limit are transmitted to the automatic power controller 32 (S23).

As described above, according to the embodiment of the present invention, by changing the reactor power based on the simple information like a LPRM signal, and observing the thermal limit with high reliability calculated by the core performance calculator 31 to adjust and suspend the power of the nuclear reactor automatically.

For this reason, the thermal limit can be adjusted close to the full limit G within a short time and without increase the workload of the operator.

The present invention is not limited to the embodiments disclosed. The present invention can appropriately be deformed and implemented within the scope of common technical conceptions.

The reactor core monitoring system can implement respective means as respective function programs by computer. The nuclear power plant controlling system can also be operated by a nuclear power plant controlling program formed by combining the respective function programs.

In this embodiment, although the suspend instruction of power control is transmitted when the second signal S2 arrived at the threshold K, control can also be suitably changed so that a suspend instruction may be transmitted when the first signal S1 arrived at a threshold or full limit G. Note that the different threshold is available for the first signal S1 or the second signal S2, respectively.

REFERENCE SIGNS LIST

10 . . . nuclear reactor
11 . . . pressure vessel
12 . . . main steam line
13 . . . feed water line
14 . . . steam-water separator 15 . . . reactor core
16 . . . recirculation pump
17 . . . fuel assembly
18 . . . control rod
19 . . . drive
20 . . . instrumentation pipe
21 . . . LPRM detector
30 . . . control device
31 . . . core performance calculator
32 . . . automatic power controller
33 . . . control rod operating unit
34 . . . recirculation flow operating unit
40 . . . thermal limit monitor
41 . . . first signal receiver
42 . . . second signal receiver
43 . . . compensation formula definition unit
44 . . . compensating unit
45 . . . prospective time deriving unit
46 . . . judging unit
47 . . . rate varying unit
48 . . . comparing unit
50 . . . power control instruction transmitter (first instruction transmitter)
51 . . . suspend instruction transmitter (second instruction transmitter)
52 . . . memory
S1 . . . LPRM signal (first signal)
S2 . . . thermal limit, maximum linear heat generation ratio, minimum critical power ratio (second signal)
J1 . . . power control instruction (first instruction)
J2 . . . suspend instruction (second instructions)
G . . . full limit
K . . . threshold
m . . . preset value
f . . . prospective time
F . . . core flow
W . . . attaining time
R . . . request signal
D . . . downcomer
L . . . lower plenum
U . . . top plenum

The invention claimed is:

1. A nuclear power plant controlling system, comprising:
a first signal receiver configured to receive a first signal, the first signal being acquired at a sampling interval having a shorter time period than that of a calculation time of a second signal and also being compensated by a compensation formula to imitate the second signal such that an error value of a compensated first signal against the second signal is positive;
a prospective time deriving unit configured to derive a prospective time for the compensated first signal to reach a full limit, the full limit suspending an automatic control of reactor power with an automatic output controller;
a judging unit configured to judge whether a remaining time until the prospective time exceeds a preset value set for a longer time than the calculation time of the second signal, and then to output a request signal for starting calculation of the second signal by a core performance calculator-configured to calculate a power distribution in a reactor core if the remaining time until the prospective time exceeds the preset value;
a compensating unit configured to compensate the first signal based on the compensation formula as refined with the calculated second signal calculated in response to the request signal;
a first instruction transmitter configured to transmit a first instruction to the automatic output controller to vary a rate factor of the compensated first signal and the second signal by synchronizing with the refined compensation formula so that a power rate of a nuclear reactor is reduced; and
a second instruction transmitter configured to transmit a second instruction to the automatic output controller to hold the reactor power after the compensated first signal or the second signal reaches the full limit or a threshold that is just before the full limit,
wherein the first signal is outputted from a low power range monitoring (LPRM) detector configured to detect neutrons,
wherein the second signal is a maximum linear heat generation ratio or a minimum critical power ratio transmitted from the core performance calculator,
wherein the first instruction is a power control instruction, which instructs a control rod operating unit and a recirculation flow operating unit so as to reduce the power rate of the nuclear reactor, and
wherein the second instruction is a suspend instruction, which instructs the control rod operating unit and the recirculation flow operating unit so as to suspend the automatic control of reactor power.

2. The nuclear power plant controlling system according to claim 1, further comprising:
a rate varying unit configured to vary the rate factor based on another derived prospective time, said another derived prospective time being a time for the second signal to reach the threshold.

* * * * *